(12) United States Patent
Fricke et al.

(10) Patent No.: US 8,149,183 B2
(45) Date of Patent: Apr. 3, 2012

(54) DISPLAY

(75) Inventors: Peter James Fricke, Corvallis, OR (US); Alan R. Arthur, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1242 days.

(21) Appl. No.: 11/831,014

(22) Filed: Jul. 31, 2007

(65) Prior Publication Data

US 2009/0033587 A1 Feb. 5, 2009

(51) Int. Cl.
*G09G 5/00* (2006.01)

(52) U.S. Cl. ............ 345/4; 345/1.1; 345/1.3; 345/5; 345/901; 345/903; 434/317

(58) Field of Classification Search ............ 345/1.1–1.3, 345/4–6, 901, 903; 434/317
See application file for complete search history.

(56) References Cited

U.S. PATENT DOCUMENTS

| | | | |
|---|---|---|---|
| 3,662,807 A * | 5/1972 | Miller | 160/135 |
| 4,597,635 A | 7/1986 | Hoshikawa | |
| 4,865,111 A * | 9/1989 | Perutz | 160/135 |
| 4,979,554 A * | 12/1990 | Nelson | 160/135 |
| 5,034,736 A | 7/1991 | Bennett et al. | |
| 5,197,280 A * | 3/1993 | Carpenter et al. | 60/204 |
| 5,416,494 A * | 5/1995 | Yokota et al. | 345/79 |
| 5,436,744 A | 7/1995 | Arledge et al. | |
| 5,609,488 A * | 3/1997 | McTaggart | 434/317 |
| 5,703,436 A * | 12/1997 | Forrest et al. | 313/506 |
| 5,803,748 A * | 9/1998 | Maddrell et al. | 434/317 |
| 5,818,165 A | 10/1998 | Malhi | |
| 6,108,484 A * | 8/2000 | Lim et al. | 386/46 |
| 6,229,502 B1 * | 5/2001 | Schwab | 345/1.1 |
| 6,299,337 B1 | 10/2001 | Bachl et al. | |
| 6,365,270 B2 * | 4/2002 | Forrest et al. | 428/336 |
| 6,850,212 B1 | 2/2005 | Aitken et al. | |
| 6,850,312 B2 | 2/2005 | Jacobsen et al. | |
| 6,972,732 B1 * | 12/2005 | Nishikawa | 345/1.1 |
| 7,249,324 B2 * | 7/2007 | Nakamura et al. | 715/776 |
| 2003/0160735 A1 | 8/2003 | Lee et al. | |
| 2004/0005438 A1 * | 1/2004 | Lichodziejewski et al. | 428/166 |
| 2005/0110702 A1 * | 5/2005 | Aoki et al. | 345/30 |
| 2006/0125802 A1 * | 6/2006 | Liang et al. | 345/173 |
| 2006/0214922 A1 * | 9/2006 | Moore et al. | 345/173 |

* cited by examiner

*Primary Examiner* — Lun-Yi Lao
*Assistant Examiner* — Sosina Abebe

(57) ABSTRACT

Various embodiments and methods relating to driving a stacked arrangement of display panels are disclosed.

13 Claims, 2 Drawing Sheets

DISPLAY

BACKGROUND

Displays may sometimes use a stack of display panels. Each display panel in the stack uses an independent set of drive electronics, increasing cost and complexity of the stacked display.

DETAILED DESCRIPTION OF THE EXAMPLE EMBODIMENTS

Figure 1:
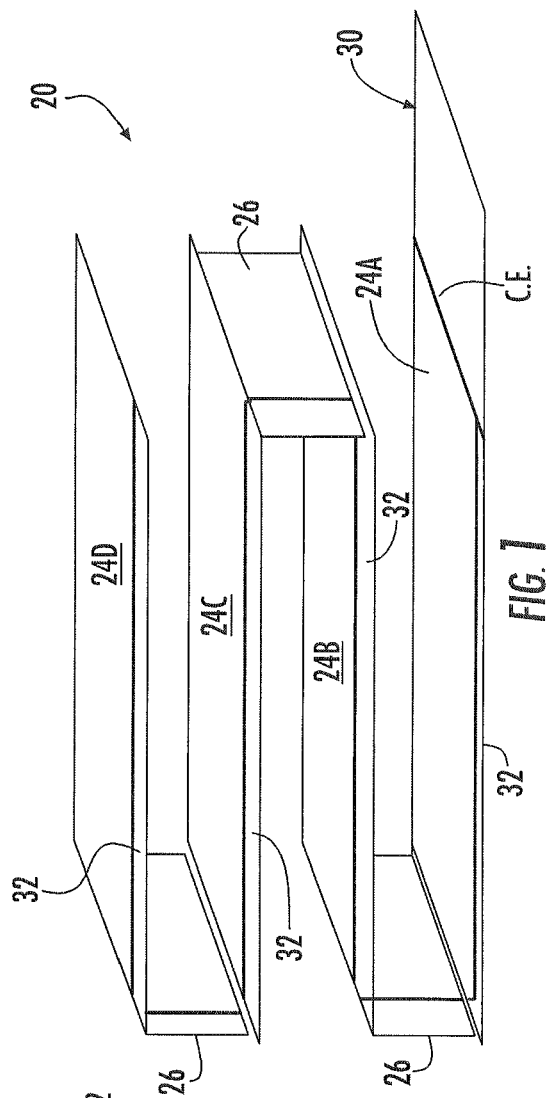
FIG. 1 is a perspective view of a display according to an example embodiment.
Figure 2:
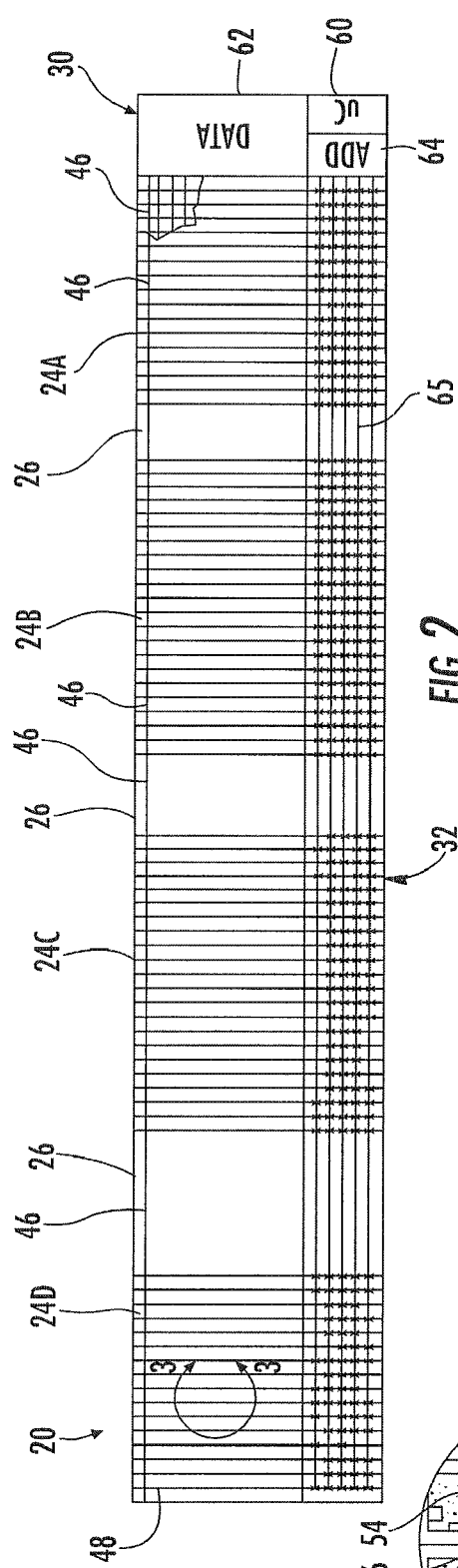
FIG. 2 is a top plan view of the display of FIG. 1 in an unfolded state according to an example embodiment.
Figure 3:
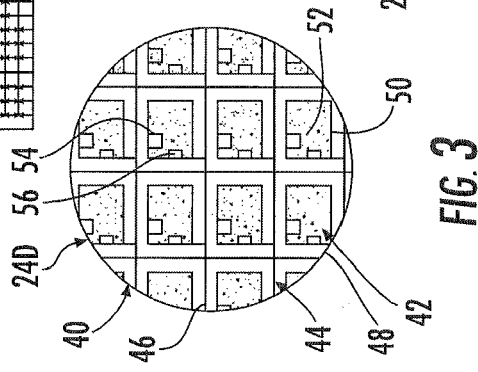
FIG. 3 is an enlarged fragmentary top plan view of a portion of the display of the FIG. 2 take along lines 3-3 according to an example embodiment.

FIGS. 1-3 illustrate display 20 according to one example embodiment. Display 20 comprises a stacked display in which a composite display image is provided by multiple display panels which overlap one another. Each panel provides a portion of the overall composite image of display 20. As will be described hereafter, display 20 has an architecture and employs a control scheme reducing drive electronics to reduce complexity and cost of display 20.

Display 20 includes display panels 24A, 24B, 24C, 24D (collectively referred to as panels 24), interconnects 26, control electronics 30 and demultiplexers 32. Display panels 24 each comprise a panel supporting or carrying at least one display grid of display pixels. FIG. 3 is an enlarged schematic illustration of a portion of display panels 24D. As shown by FIG. 3, display panel 24D includes a grid 40 of pixels 42 and a corresponding grid 44 of pixel control lines including data lines 46 and selector lines 48. Each pixel 42 includes a pixel well 50, electro-optical material 52 and one or more electrodes 54, 56. Pixel wells 50 comprises a basin, well or other defined volume formed from one or more sidewalls that is configured to form a boundary of the particular pixel 50 and to contain electro-optical material 52. Although pixel well 50 are illustrated as being generally square or rectangular in shape, in other embodiments, pixel wells 50 may have other shapes.

Electro-optical material 52 comprises one or more charge responsive optical materials configured to change between different optical states in response to an applied electrical field or electrical charge applied by one or more of electrodes 54, 56. In one embodiment, electro-optical material 52 may be configured to change between a transparent or translucent state and an opaque state in response to an applied electrical field or electrical charge. In another embodiment, electro-optical material 52 may be configured to change between a first colored state and a second distinct colored state in response to an applied electoral field or electrical charge. As noted above, the opaque state may comprise a colored state such as cyan, magenta, yellow, red, green, blue or other colors. The opaque state may also comprise a darkened gray or black state. Examples of electro-optical material include, but are not limited to, dyed or undyed polymer dispersed liquid crystal, electrophoretic, or cholesteric liquid crystals.

Electrodes 54, 56 comprise electrically conductive structures configured to apply the electrical field or electrical charge to electro-optical material 52. As will be described hereafter, electrodes 54, 56 apply the electrical field or charge based upon or in response to signals received via grid 44 of data lines 46 and selector lines 48. In the particular example, the electrodes 54, 56 are both substantially contained in a same plane within or adjacent to pixel well 50. In another embodiment, electrodes 54, 56 may alternatively extend on an opposite faces of pixels well 50 with electro-optical material 52 sandwiched therebetween. Although electrodes 54, 56 are illustrated as extending across only a portion of pixel well 50, in other embodiment, electrodes 54, 56 may alternatively extend across a larger portion or across an entirety of one or both faces of pixel well 50.

Grid 44 of data lines 46 and selector lines 48 transmits electrical signals from control electronics 30 to pixels 42 to selectively activate or actuate the electro-optical material 52 within the selected pixel wells 50. Data lines 46 supply the voltage or charge for activating electro-optical material 52. Selector lines 48, supply the electrical signal which acts upon a switching mechanism, such as a transistor, metal insulator metal device and the like, to control whether the charge provided by data lines 46 is transmitted to one of electrodes 54, 56 and applied to the electro-optical material 52. As will be described hereafter, in the particular example illustrated, data lines 46 of each of display panels 24 extend across interconnects 26 and are directly connected to control electronics 30. Selector lines 48 of each of display panels 24 are connected to control electronics 30 by demultiplexers 32 and demux address lines 65 (shown in FIG. 2). In other embodiments, selector lines 48 may be directly connected to control electronics 30.

Although not illustrated, display panels 24 may include additional components. For example, as noted above, display panels 24 may include one or more switching elements providing an active matrix control. Although not illustrated, display 20 may additionally include covers or lids over such pixel wells 50. Overall, display panels 24 may include additional elements or components facilitating use of panels 24 as part of a reflective display or a transmissive display.

As shown by FIG. 1, display panels 24 are arranged or supported so as to overlap or extend across from one another in a stacked arrangement. According to one embodiment, each of display panels 24 provides a distinct color plane of the composite display image. For example, in one embodiment, display panel 24A may include pixels 42 that actuate to a cyan colored state, display panel 24B may include pixels 42 that actuate to a yellow colored state, display panel 24C may include pixels 42 that actuate to a magenta colored state and display panel 24D may include pixels 42 that actuate to a black or white state. In another embodiment, display panels 24 may actuate to red, green, blue and black or white states. In still other embodiments, display 20 may include additional or fewer of such panels 24 which overlap one another.

In one embodiment, each display panel 24 may include pixels 42 along a single face of each panel. In yet another embodiment, each display panel 24 may include pixels 42 on both opposing faces. For example, both faces of one or more of panels 24 may include a grid 40 of pixels 42. In such an embodiment, display 20 may alternatively include just two panels 24 that overlap and that provide four color planes for a composite display image.

Interconnects 26 comprise flexible bands, panels or other structures that interconnect panels 24 and that serve as hinges, permitting interconnects 26 to be bent and folded so as to position panels 24 in an overlapping and stacked arrangement. In one embodiment, interconnects 26 further support data lines 46 extending between panels 24. In the example embodiment, interconnects 26 further support demux address lines 65 and demultiplexers 32 to one side of panels 24. In another embodiment, demux address lines 65 and demultiplexers 32 may be supported at other locations.

In the example embodiment illustrated, interconnects 26 are integrally formed as part of a single unitary body with the same material and structures forming at least a portion of display panels 24. As a result, display panels 24 and interconnects 26 may be fabricated from a continuous roll of one or more materials (i.e., a roll to roll process). In one embodiment, interconnects 26 may have a reduced thickness or may be formed from a different mixture of materials or different combination of layers such that interconnects 26 are flexible while the integral portions of panels 24 are more rigid or stiff. In one embodiment, interconnects 26 are formed from a flexible polymer or plastic. In yet another embodiment, interconnects 26 may be bonded, welded, fused, fastened or otherwise joined to consecutive panels 24. Although interconnects 26 are illustrated as continuously extending across and between panels 24, in other embodiment, interconnects 26 may comprise a plurality of spaced flexible bands or other structures extending between panels 24.

Control electronics 30 comprises an electronic device configured to selectively drive or actuate pixels 42 on each of display panels 24 to form the composite image. In particular, control electronics 30 generates electrical signals which are transmitted by data lines 46 (a few of which are partially shown in FIG. 2) and by demux address lines 65 and selector lines 48 to pixels 42. Because control electronics 30 drives or actuate pixels 42 on each of display panels 24, rather than a separate data driver being provided for each display panel 24, the cost and complexity of display 20 is reduced.

As schematically shown by FIG. 2, display driver 30 includes processor or microcontroller 60, data driver 62 and address driver 64. Microcontroller 60 comprises one or more processing units configured to generate control signals using data driver 62 and address driver 64 based upon the image data. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, microcontroller 60 may be embodied as part of one or more application-specific integrated circuits (ASICs). Unless otherwise specifically noted, the controller is not limited to any specific combination of hardware circuitry and software, nor to any particular source for the instructions executed by the processing unit.

Data driver 62 in response to control signal from microcontroller 60 provides data signals at a selected voltage along selected data lines 46. Once again, as shown in FIG. 2, data lines 46 continuously extend from data driver 62 across interconnects 26 to each of display panels 24. Because data driver 62 supplies data voltages or signals for each of display panels 24, the cost and complexity of display 20 is reduced.

Address driver 64, in response to control signals from microcontroller 60, supplies address voltages to the demux inputs or selector signal voltages to selected selector lines 48. In the example illustrated in which display 20 includes demultiplexers 32, address driver 64 further multiplexes such selector signals. In particular, each selector signal is provided with a binary multi-bit code word addressed to a particular pixel 42 on a particular one or more of display panels 24. In embodiments where demultiplexers 32 are not employed, address driver 64 may omit such multiplexing.

Demultiplexers 32, also known as "demuxers," comprise electronic devices or components configured to demultiplex or "demux" the address signals prior to such selector signals being transmitted to display panels 24 along selector lines 48. In effect, demultiplexers 32 route selector signal along a selector line 48 and permit the routed signal to be transmitted to a particular pixel 42 of a particular display panel 24 based upon the code word associated with the selector signal. Demultiplexers 32 facilitate transmission of multiple control signals for multiple pixels of multiple display panels 24 to be combined and transmitted along a single selector line 48 prior to being demultiplexed (demuxed). As a result, the number of electrically conductive demux address lines or traces 65 used to transmit selector signals to all the pixels 42 of all display panels 24 may be greatly reduced. Reducing the number of electrically conductive lines for transmitting signals from address driver 64 to display panels 24 reduces fabrication cost and complexity. For example, in one embodiment where display 20 is 42 inches and has a resolution of 300 lines per inch, the number of selector lines 48 carrying selector signals to display panels 24 from address driver 64 may reduce from 10,800 lines to 160 lines using demultiplexers 32. In other embodiments, the number of selector lines for transmitting selector or address signals to display panels 24 may be reduced to different degrees.

In one embodiment, each demultiplexer 32 comprises a resistor and driver network or circuit. In another embodiment, demultiplexers 32 may comprise diode or transistor-based demultiplexers. In yet another embodiment, demultiplexers 32 may comprise other electronic components configured to demux multiplexed or combined signals.

Figure 4:
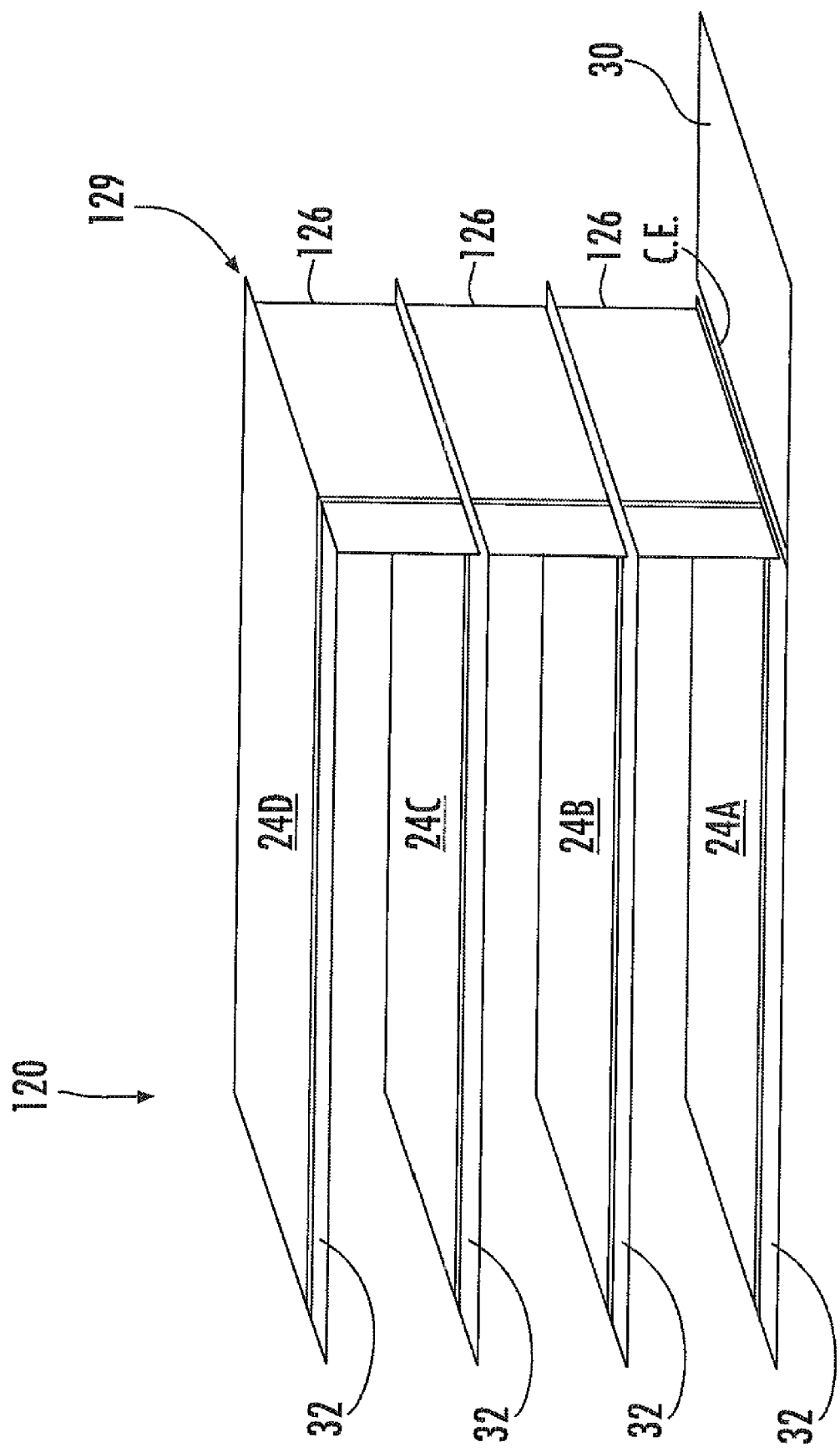
FIG. 4 is a perspective view of another embodiment of the display of FIG. 1 according to an example embodiment.

FIG. 4 schematically illustrates display 120, another embodiment of display 20 shown in FIGS. 1-3. Display 120 is similar to display 20 except that display 120 includes interconnects 126 in place of interconnects 26 (shown in FIGS. 1 and 2). Those remaining elements of display system 120 which correspond to elements of display system 20 are numbered similarly.

As shown by FIG. 4, as with interconnects 26, interconnects 126 join and support display panels 24 in an overlapping or stacked arrangement. However, rather than alternating on opposite ends of display panels 24, interconnects 126 are located proximate to a same end a portion or edge 129. In one of the embodiment, interconnects 126 extend in a single plane. In one embodiment, interconnects 126 extend along edges of panels 24 so as to abut edges of panels 24 or such that panels 24 extend from interconnects 126. In one embodiment, interconnects 126 comprise a single integral unitary panel. In another embodiment, interconnects 126 may comprise separate individual panels which are joined to one other and which are joined to panels 24. In another embodiment, interconnects 126 may comprise separate panels sandwiched between opposing faces of consecutive panels 24. In one embodiment, interconnects 126 are formed from a flexible material such as a flexible polymer. In one embodiment, each interconnect 126 may be integrally form as part of a single unitary body with one or more of panels 24. In another embodiment, interconnects 126 may alternatively be rigid or stiff.

As with interconnects 26, interconnects 126 physically connect panels 24 while supporting data lines 46 and selector lines 48 (shown in FIG. 2). In one embodiment, interconnects 26 may further extend along the sides of panels 24 and support demultiplexers 32 (shown in FIG. 2). In other embodiment, demultiplexers 34 may be supported on portions of interconnects 126 extend between panels 24. In other embodiments, multiplexes 32 may be supported at other locations.

As with display 20, display 120 has control electronics 30 utilizing a single data driver 62 (shown in FIG. 2) for driving each of display panels 24. As with display 20, display 120 includes demultiplexers 32 for demuxing selector signals transmitted from address driver 64 (shown in FIG. 4) to display panels 24. As with display 20, display 120 provides a 4:1 aspect ratio display with one set of electronics. As a result, the cost and complexity of display 120 is reduced.

Although displays 20 and 120 are illustrated as synergistically combining multiple features: (1) use of a single data driver for multiple stacked display panels; (2) use of demultiplexers facilitating driving of the multiple stacked display panels with fewer address or selector lines and (3) an electrically interconnected, and potentially folded electrically interconnected, architecture, in other embodiments, these three beneficial features may be used in other display architectures independent of one another or in other combinations. For example, in one particular embodiment, demultiplexers 32 may be omitted. In other embodiments, demultiplexers 32 may additionally or alternatively be provided for demuxing multiplex data signals along data lines 46. In other embodiments, multiple data drivers 62 may be employed for display panels 24. Likewise, in other embodiments, interconnects 126 may be omitted or may have other arrangements or configurations for supporting and electrically interconnecting display panels 24.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    display panels in a stacked arrangement, each panel, while in the stacked arrangement, providing a portion of a composite display image that is formed by a combination of overlapping regions of the display panels while the display panels are in the stacked arrangement;
    a data driver, wherein each of the display panels is connected to the data driver and interconnects connecting the display panels, wherein the interconnects are folded such that the panels overlap.

2. The apparatus of claim 1, further comprising a code word demultiplexor continuously extending along each of the display panels and across each of the interconnects.

3. The apparatus of claim 1 further comprising interconnects connecting the display panels, wherein the interconnects are proximate a same edge of the display panels and wherein the display panels extend from a same face of the interconnects.

4. The apparatus of claim 1 further comprising a code word demultiplexor, wherein each of the display panels is connected to the code word demultiplexor.

5. The apparatus of claim 1, wherein each panel provides a distinct color plane of the composite display image.

6. The apparatus of claim 1, wherein the display panels include at least three display panels.

7. The apparatus of claim 1, wherein the display panels include at least four display panels.

8. The apparatus of claim 1, wherein the interconnects are flexible so as to serve as hinges between those display panels that are consecutive.

9. The apparatus of claim 1, wherein the interconnects are integrally formed as part of a single unitary body with at least a portion of the display panels and wherein the interconnects are formed out of a same material as a portion of the display panels.

10. A method comprising:
    providing a stacked arrangement of display panels, wherein the display panels, while in the stacked arrangement, provide a composite display image that is formed by a combination of overlapping regions of the display panels while the display panels are in the stacked arrangement;
    selectively driving pixels of each of the display panels with a single data driver folding interconnects between consecutive display panels.

11. The method of claim 10, wherein the pixels are selectively driven by transmitting electrical signals across interconnects extending proximate a same edge of the display panels.

12. The method of claim 10, wherein the pixels of all the display panels are selectively driven using a code word demultiplexor.

13. The method of claim 10, wherein each of the display panels is configured to provide a distinct color plane of a composite displayed image.

* * * * *

UNITED STATES PATENT AND TRADEMARK OFFICE
CERTIFICATE OF CORRECTION

| | | |
|---|---|---|
| PATENT NO. | : 8,149,183 B2 | Page 1 of 1 |
| APPLICATION NO. | : 11/831014 | |
| DATED | : April 3, 2012 | |
| INVENTOR(S) | : Peter James Fricke et al. | |

It is certified that error appears in the above-identified patent and that said Letters Patent is hereby corrected as shown below:

In column 6, line 9, in Claim 2, delete "demultiplexor" and insert -- demultiplexer --, therefor.

In column 6, line 17, in Claim 4, delete "demultiplexor," and insert -- demultiplexer, --, therefor.

In column 6, line 18, in Claim 4, delete "demultiplexor." and insert -- demultiplexer. --, therefor.

In column 6, line 49, in Claim 12, delete "demultiplexor." and insert -- demultiplexer. --, therefor.

Signed and Sealed this
Eighteenth Day of December, 2012

David J. Kappos
*Director of the United States Patent and Trademark Office*